Aug. 8, 1933.  E. SEGER  1,921,485
FEEDER FOR PORTABLE TOOLS
Filed Sept. 18, 1930  4 Sheets-Sheet 1

INVENTOR:
Earl Seger
by Macleod, Calver, Copeland & Dike
Attys.

Aug. 8, 1933.  E. SEGER  1,921,485
FEEDER FOR PORTABLE TOOLS
Filed Sept. 18, 1930  4 Sheets-Sheet 2

INVENTOR:
Earl Seger
by Macleod, Calver, Copeland & Dike
Attys.

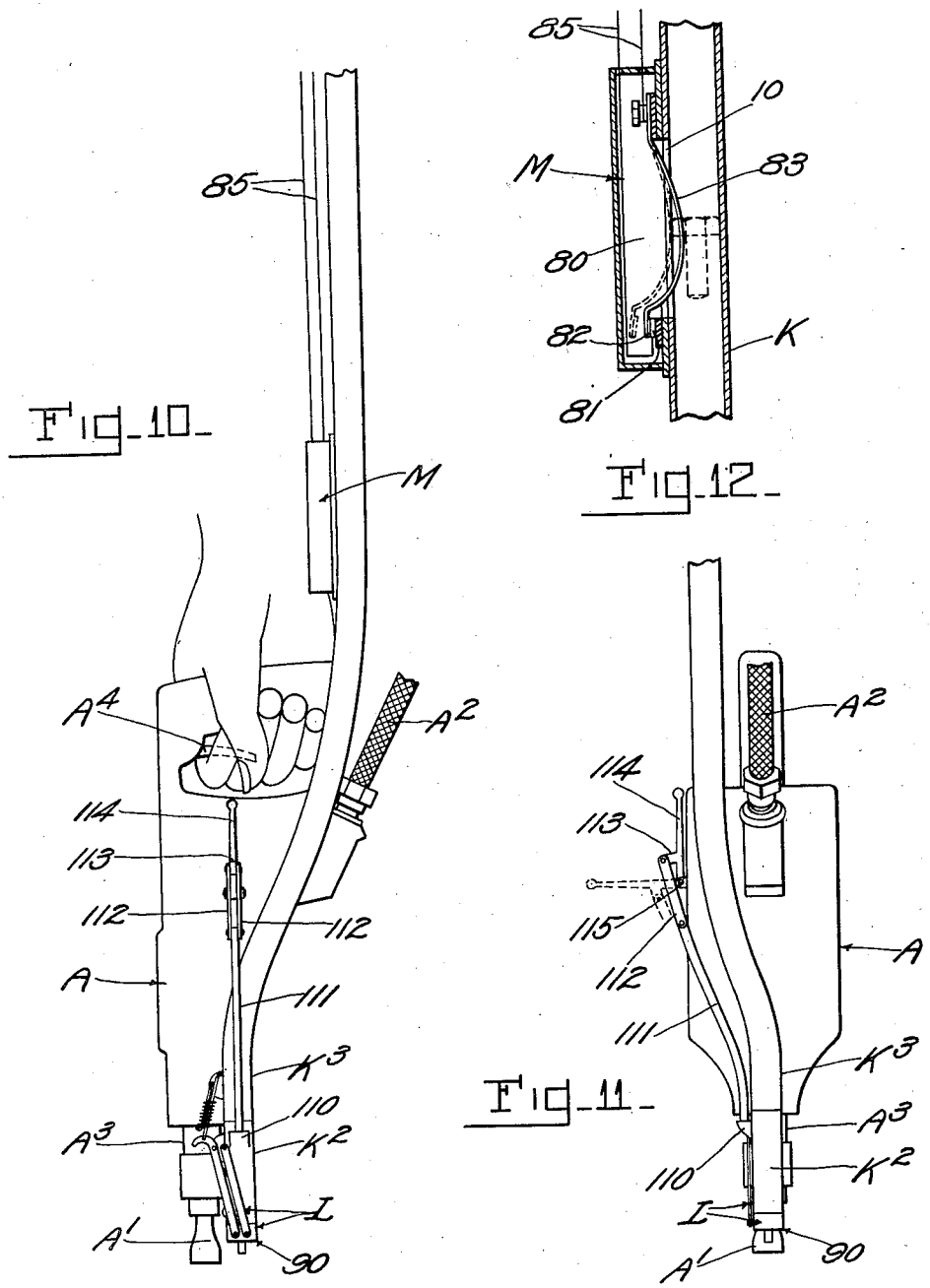

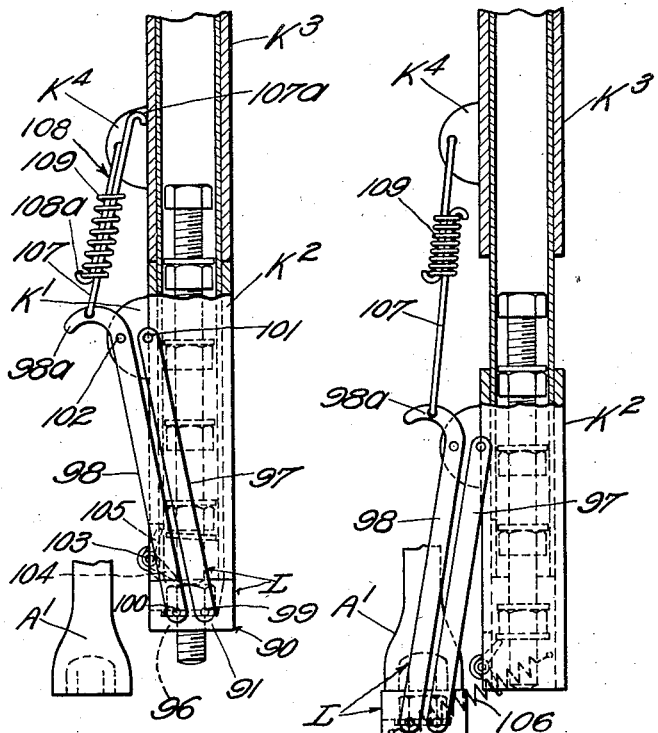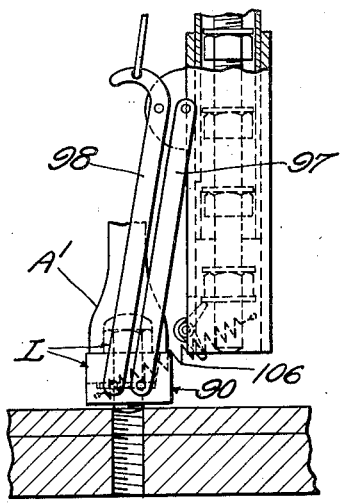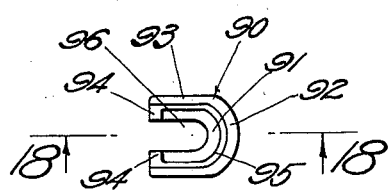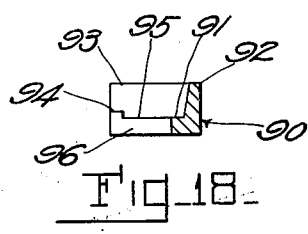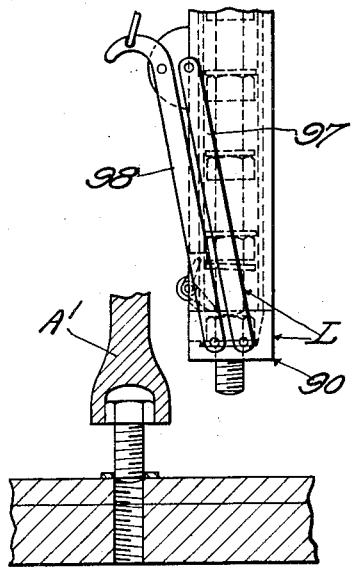

Patented Aug. 8, 1933

1,921,485

UNITED STATES PATENT OFFICE 1,921,485

FEEDER FOR PORTABLE TOOLS

Earl Seger, Detroit, Mich., assignor to Hudson Motor Car Company, Detroit, Mich., a Corporation of Michigan Application September 18, 1930
Serial No. 482,800

10 Claims.  (Cl. 10—162)

This invention relates to power operated tools such for example, as wrenches for applying nuts, cap screws and the like to work; cotter pin inserters; riveters; or any other tools of similar character, and more particularly, to a method and apparatus for feeding or supplying parts to the tool.

Power operated tools having working heads which are driven mechanically or electrically are now in general use, but it is necessary with these tools to supply or feed by hand the parts to be applied by the head, thus requiring the services of two operators, one to insert the parts in the work, and the other to operate the tool to complete the application of the parts to the work. With mass producion methods such as are in general use in automobile factories and the like, it is desirable to perform assembling operations with a minimum number of operators so to reduce production and labor costs while at the same time maintaining the required rate of production.

The present invention provides a method and apparatus whereby the operations of assembling parts of automobiles or other machines can be speeded up while at the same time the number of operatives otherwise required is reduced to half, or even less, the number now employed, thus reducing labor costs at least fifty percent. It is, therefore, one of the objects of my invention to provide a method and apparatus for delivering or feeding parts to a power operated tool, automatically and in predetermined quantities, whereby a single operator is enabled to do the work of two or more operators quicker, and in a more efficient manner than has been heretofore possible.

Another object of my invention is to provide mechanical means, under the control of the tool operator, for manually transferring the parts from the delivering or feeding device to the working head of the tool to permit them to be inserted and then applied by the same apparatus and by the same operator.

Other objects of the invention will appear from the following description and appended claims when considered in connection with the accompanying drawings, in which like reference characters designate similar parts in the several views.

In said drawings:

Fig. 3 is a section on line 3—3 of Fig. 1.

Fig. 4 is an enlarged fragmentary view of one of the pulleys of the conveyor for cap screws.

Fig. 9 is an enlarged vertical section of the clutch mechanism of my invention.

Fig. 10 is an enlarged elevational view of the tool forming a part of my invention.

Fig. 11 is an elevation of the tool as viewed from the right of Fig. 10.

Fig. 12 is a fragmentary detail view, partly in section, of the switch for regulating the feed of parts to the tool.

Figure 1:
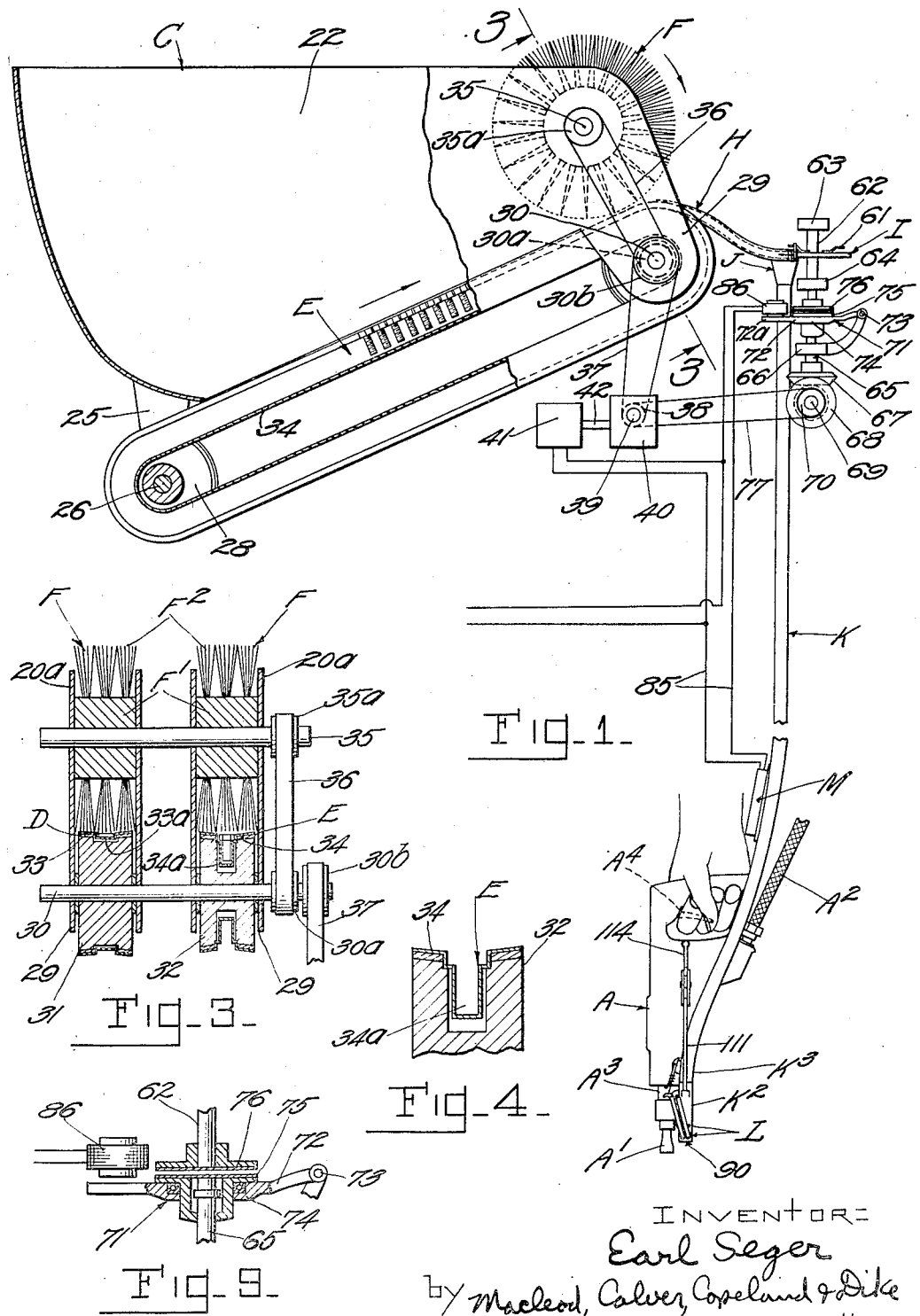
Fig. 1 is an elevational view, partly in diagram and partly broken away, of the entire apparatus.

Figs. 13 to 16 inclusive are fragmentary elevational views, partly in section, of the feed tube, tool head and parts carrier, illustrating the different positions of the instrumentalities during the steps of transferring the parts by the carrier from the feed tube to the working head of the tool, and the application of the parts to the work by the carrier and tool head.

Fig. 17 is a top plan view of the parts carrier.

Fig. 18 is a section on line 18—18 of Fig. 17.

Before explaining in detail the present invention it is to be understood that the invention is not limited in its application to the details of construction and arrangement of parts illustrated in the accompanying drawings, since the invention is capable of other embodiments and of being practised or carried out in various ways. Also it is to be understood that the phraseology or terminology employed herein is for the purpose of description and not of limitation, and it is not intended to limit the invention beyond the terms of the several claims hereto appended as considered in view of the prior art and the requirements thereof.

A machine or apparatus of my invention comprises an electrically driven tool having a working head, the tool being provided with a switch under the control of the operator for cutting in or shutting off the current to the motor to operate the tool head, together with means for feeding or delivering parts, in the present instance, lock washers and cap screws, from a supply hopper to the tool; and means interposed between the supply hopper and the tool for delivering parts to the tool feeding means in predetermined quantities, the feed of the parts being controlled by means of the parts themselves; and a manually operable carrier or device also under the control of the tool operator for transferring parts, as desired, from the feeding means to the tool head. The machine or apparatus is semi-automatic and is capable of inserting and applying parts to the work at any desired point automatically with the exception of means for controlling the supply of current to the operating motor and means for actuating the carrier for the parts, which are controlled manually by a single operator. The apparatus is provided with a single switch under the control of the operator, which, when actuated by the operator, allows current to flow to the electric motor for operating the tool head, starts the conveyors for the parts into operation and simultaneously causes rotation of the selector device for selecting and delivering the parts from the conveyors to the feed tubes which carry them to the tool. After a predetermined quantity of the parts have entered the feed tube, a switch located in the feed tube automatically shuts off the current to the selector and stops the feed of parts to the feed tube. The only necessary additional act on the part of the operator to insert and apply the parts to the work is that of manually actuating the parts carrier to transfer the parts from the feed tube to the working head of the tool which automatically inserts and applies the parts without further effort on the part of the operator. After a predetermined number of parts have been removed from the feed tube to the tool head and inserted and applied to the work, the automatic switch functions to again start in motion the selector device to feed an additional predetermined quantity of parts to the feed tube. It will be seen that the feed of parts from the supply hoppers and conveyors to the feed tube and selector device is intermittent, the parts being fed in predetermined quantities, and the feed of said parts being automatically controlled. This permits one operator to effect the application of the parts to the work without requiring his time to feed the parts by hand as heretofore, thus permitting him to perform the work which ordinarily requires the services of two or more operators.

Referring now to the drawings, the tool constituting a part of my invention is designated as a whole by A. The supply hoppers for the parts are shown at B and C, the hopper B in the present instance containing lock washers, and the hopper C containing cap screws. Cooperating with the hoppers and located preferably in the bottom thereof, is a pair of endless conveyors, the one for the hopper B being designated at D and the conveyor for the hopper C being designated as a whole at E. Located in the throat or mouth of the hoppers, above the conveyors D and E, is a pair of rotary brushes, F, F, which are rotated in a clockwise direction, or opposite to the direction of rotation of the conveyors, for the purpose of removing surplus parts from the conveyors. At G and H chutes or conveyors are shown for delivering lock washers and cap screws, respectively, from the hoppers B and C. A selector device, preferably in the form of a notched wheel is shown as a whole at I, the selector being so constructed and operated as to collect first a lock washer and then a cap screw from the chutes G and H and deliver them to a funnel J located at a point below and adjacent the periphery of the selector wheel. This funnel forms a part of a flexible tube or magazine, shown as a whole at K, which serves to feed or conduct the lock washers and cap screws to the tool A. Located at the lower end of the tube and in register therewith, is a manually controlled parts carrier or transfer device shown as a whole at L, which serves to remove the lock washers and cap screws in pairs from the tube and deliver them to the actuating head A' of the tool A. Located within the feed tube or chute K is an electric switch, shown as a whole at M, which serves to automatically regulate or control the feed of parts to the end of the feed tube or magazine K in predetermined quantities.

*The hoppers, conveyors and associated instrumentalities*

Referring particularly to Figs. 1, 2, 3 and 4, the hoppers B and C may be of any desirable shape or form, and as shown in the drawings, have side and end walls 20 and 21, respectively, and a central vertical partition or wall 22 flared outwardly at 23 and extended to provide spaced walls 24. These walls 24 are located within the reduced forward end or throat of the hoppers formed between converging forward end portions 20a of the side walls. The hoppers are open at their tops to permit them to be readily filled with the desired parts. The hoppers are provided with depending brackets 25 which form bearings for a horizontal shaft 26 on which is mounted for rotation a pair of pulleys 27 and 28 below the hoppers B and C, respectively. The forward or throat portion of the hoppers is provided with a pair of depending brackets or extensions 29 serving to support or act as bearings for a shaft 30, on which shaft is mounted for rotation, a pair of grooved pulleys 31 and 32, located below the hoppers B and C, respectively, these pulleys corresponding to the pulleys or wheels 27 and 28. The pairs of pulleys 27, 28 and 31, 32 serve as front and rear supports for a pair of endless belts 33 and 34 constituting the conveyors D and E previously referred to, and mounted, respectively, below the hoppers B and C. These conveyors are best shown in Figs. 3 and 4. In Fig. 3, the conveyor 33 is provided with a longitudinal depression or recess 33a of a size corresponding to the size of the lock washers, and the conveyor 34 is provided with a depression or longitudinal groove 34a corresponding to the shape of the cap screws contained within the hopper C (see also Fig. 4). It will be seen that the pulleys and their corresponding conveyors are each shaped or formed to receive the respective parts which they are designed to deliver to the chutes G and H.

Figure 2:
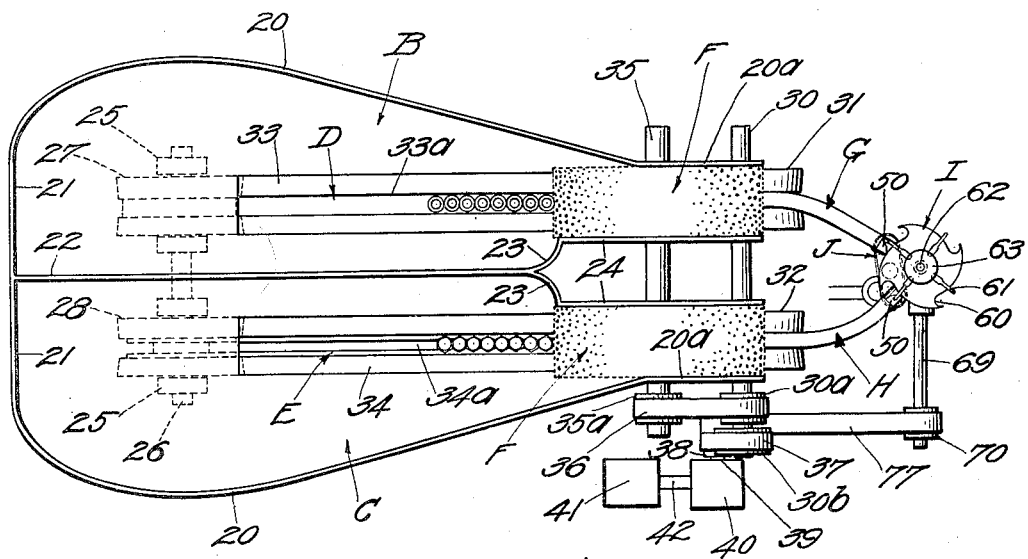
Fig. 2 is a top plan view of the apparatus in Fig. 1.

Journaled in the walls 20a and 24 is a shaft 35 (Fig. 1) upon which shaft the brushes F are mounted, the brushes being located within the throat portions of the hoppers, as best shown in Fig. 2. The brushes F may be of any suitable construction, and as illustrated, have hub portions F' and metal bristles F². The shaft 35 is preferably provided at one end with a pulley 35a. The shaft 30 is also provided at one end with a pulley 30a. These pulleys are connected by means of an endless belt 36 which runs over the pulleys so that the shafts 30 and 35 may be driven simultaneously. The shaft 30 is also provided with a pulley 30b of larger diameter than the pulley 30a, the pulley 30b being driven by an endless belt 37 which passes around a pulley 38 mounted upon a driven shaft 39 forming a part of suitable speed reducing mechanism, shown as a whole at 40. The speed reducer is actuated by an electric motor 41 through a motor shaft 42, the motor receiving its power from any suitable source.

When the motor is operated, the speed reducing mechanism 40 drives the shaft 30, through the medium of the pulleys and endless belt previously referred to, in a clockwise direction so as to cause movement of the endless conveyors 33 and 34 in a clockwise direction, while at the same time the shaft 35 and the brushes F mounted thereon are driven in a counter clockwise direction through the medium of the pulleys 30a and 35a and the endless belt 36. The lock washers and cap screws fall into longitudinal grooves or depressions formed in the endless conveyors 33 and 34 and gravitate into their proper positions as best shown in Figs. 1 and 3. As the conveyors move forward toward the throat of the hoppers, the parts are carried with them, and the brushes F being rotated in a direction opposite to the direction of movement of the conveyors, serve to remove or brush off any surplus lock washers and cap screws that might tend to travel forwardly with the conveyors, thus insuring the proper feed of parts to the chutes G and H.

Figure 7:
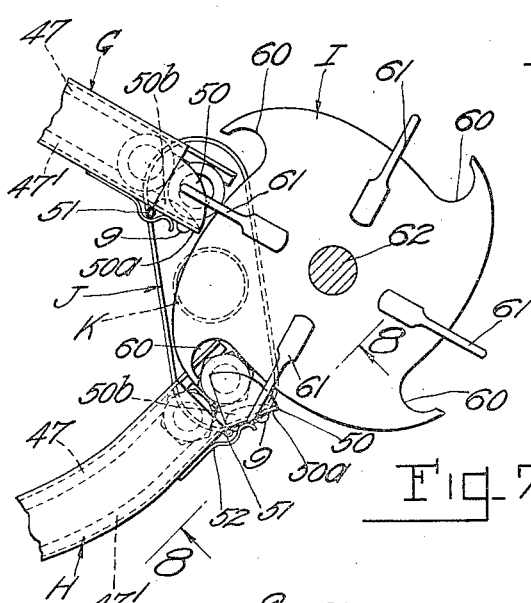
Fig. 7 is a top plan view of the selector device and associated parts.
Figure 5:
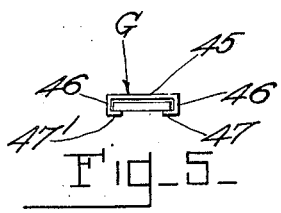
Fig. 5 is an end elevation of the chute for feeding lock washers.
Figure 6:
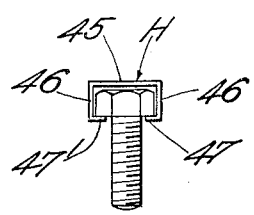
Fig. 6 is an end elevation of the cap screw chute.
Figure 8:
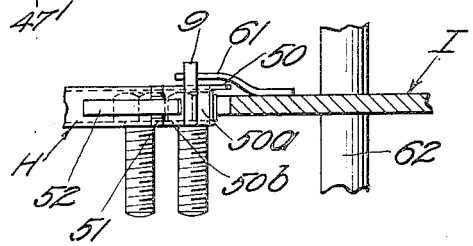
Fig. 8 is a section along the line 8—8 of Fig. 7.

Referring now particularly to Figs. 2 and 7, it will be seen that the forward ends of the chutes extend to a point adjacent the periphery of the selector I and are located immediately above the funnel J. The forward ends of the chutes G and H are provided with doors 50 hinged at 51 to the chutes. The doors are normally maintained in closed position by means of leaf springs 52. It will be understood that the funnel is connected with the upper end of the feed tube K and may form a part of this tube. Thus it will be seen that the chutes G and H have their inner end portions lying in position to cooperate with the longitudinal grooves 33a and 34a in the conveyors 33 and 34, respectively, so as to receive the lock washers and cap screws directly from the conveyors and feed them toward the lower or inner ends of the chutes where they are held against accidental displacement by the doors 50. The chutes are preferably formed of sheet metal or other suitable material having top walls, 45, side walls 46 and inturned flanges 47 and 47' which are spaced from and substantially parallel to the walls 45, these flanges serving to support the edges of the lock washers and the heads of the cap screws. It will be noted as viewed in Fig. 7 that the flanges 47' terminate short of the flanges 47 and further, that each door 50 has an upstanding side wall or portion 50a of substantially the height of the side walls 46 of its respective chute and an inwardly extending flange 50b at its lower edge which forms in effect a continuation of the flange 47' and assists in supporting the outermost lock washer or cap screw when the door is closed. It will be understood that when the door 50 is moved to open position against the action of the spring 52, the piece at the forward end of its chute is free to be moved by the selector I into the funnel J. The mechanism for operating the doors 50 will be described presently.

*The parts selector*

The selector mechanism for selecting the lock washers and cap screws from the chutes G and H, respectively, as shown, comprises preferably a rotatable wheel shown as a whole at I. The periphery of the wheel is notched at spaced intervals as shown at 60, these notches being shaped in general to conform to the shape or outline of the cap screws or lock washers to be removed from the chutes. The wheel is provided on its upper surface adjacent each notch and in advance thereof with a projecting member or finger 61, there being one of these fingers provided for each of the notches. These fingers are adapted to engage in proper sequence lugs 9 on the doors 50 to open said doors to permit the removal of the parts by the wheel I. The wheel I is mounted upon a vertical shaft 62 provided on opposite sides with thrust bearings 63 and 64 located above and below the wheel, respectively. Adjacent the lower end of the shaft 62 and in vertical alignment therewith (see Fig. 1) is a second rotary shaft 65 provided with a thrust bearing 66 and carrying on its end a bevel gear 67. The gear 67 is in mesh with a second bevel gear 68 mounted upon a horizontal shaft 69, this shaft being provided with a pulley 70. The shaft 65 is also provided with a clutch shown as a whole at 71. The clutch comprises a frame or lever 72 pivotally mounted at 73 to an arm secured to the bearing 66 and provided with a hub 74 which encircles the shaft 65 and forms a support for a friction clutch member or element 75 slidably mounted on said shaft. When the parts are in the position shown in Fig. 1, the clutch element 75 is in frictional engagement with a similar frictional clutch face or element 76 rigidly mounted on the lower end of the shaft 62. The shaft 65 is driven through the medium of an endless belt 77 which passes over the pulleys 38 and 70, the belt being driven by the speed reducing mechanism 40 which derives its power from the electric motor 41. Thus, it will be seen that when the speed reducer is in operation, the gears 68 and 67 impart a counter clockwise rotation to the shaft 65, which in turn, through the medium of the engaging faces or elements 75 and 76 of the clutch, imparts a similar rotation to the shaft 62, thereby causing rotation in a counter clockwise direction of the selector wheel I.

*Selector wheel controlling switch*

Referring particularly to Figs. 1 and 12, means is provided for starting and stopping the selector wheel so as to govern the delivery or feed of the lock washers and cap screws. This means comprises preferably an electric switch shown as a whole at M and including a casing 80 secured to the feed tube K in any suitable manner, a fixed contact 81 carried by the frame, and a movable contact 82 carried by a spring arm or member 83, which is bowed to provide a convex portion extending through the slot 10 in the tube K and projecting into the path of movement of the cap screws and lock washers as they are fed to the lower end of the feed tube. This spring member is sufficiently resilient or flexible to permit the free passage of the parts to the lower end of the feed tube. If, however, the parts are permitted to fill the end of the tube to a point above the switch, the contact members 81 and 82 will be held open as indicated in dotted lines in Fig. 12. The switch is in circuit through the medium of wiring 85 with a source of power and a magnetic coil 86 mounted in any suitable manner at a point adjacent the clutch elements 75 and 76 and immediately above the lever 72 of the clutch. When the coil is energized it will be seen that the free end portion 72a of the lever is attracted by the coil, thus moving and maintaining the friction clutch elements 75 and 76 together so that as the shaft 65 is rotated, the shaft 62 and selector wheel I are simultaneously rotated, causing the notches 60 in the wheel to collect cap screws and lock washers and drop them into the funnel J and feed tube K, it being understood that the fingers 61 engage and open the chute doors 50 so that the notched portions engage the parts and remove them from their respective chutes. The parts, as they are fed to the funnel and tube K, pass by gravity downward to the lower end of the tube. When, however, a predetermined number of the assembled lock washers and cap screws have been admitted to the tube, the uppermost cap screw will be wedged between the walls of the tube K and the spring member 83, as shown in dotted lines in Fig. 12, thus breaking the contact and opening the circuit which de-energizes the magnetic coil and allows the clutch lever to move downwardly about its pivot and to uncouple or disconnect the clutch elements 75 and 76. Further rotative motion imparted to the shaft 65 will therefore have no effect upon the shaft 62 and the selector wheel. When, however, the parts within the lower end of the feed tube have been applied to the work by the tool A in a manner fully to be described hereinafter, the topmost cap screw and lock washer move downwardly past the spring contact carrying arm or member 83, thus permitting the movable contact 82 to again engage the fixed contact 81, re-energizing the magnetic coil 86 which attracts the clutch lever 72, again coupling the clutch elements and causing further rotation of the selector wheel.

*The tool and parts transfer mechanism*

As previously stated, the tool forming a part of my invention is preferably electrically driven or operated and is shown as a whole at A. The tool comprises a casing or body portion of any suitable construction or design having a handle which may be grasped by the hand of the operator and moved about from place to place as desired. The tool casing houses an electric motor (not shown) of any desired size, preferably a motor of low horse power and of relatively light weight to permit the motor to be handled easily. The motor receives its power from any suitable source through a cable $A^2$, and is provided with a shaft $A^3$ and the working head A' previously referred to. It will be understood that the working head may be of the rotary type, such as for operating screw drivers or wrenches for applying bolts, cap screws, nuts or the like, or any of the axially reciprocating type to serve as a hammer when desirable. The tool is also provided with a trigger or finger operated switch $A^4$ located adjacent the handle. It is to be noted that the feed tube K for the parts is attached to the tool housing, and extends to a point adjacent the working head A', as best shown in Figs. 1, 10 and 11.

The carrier or mechanism for transferring the parts from the lower end of the feed tube to the working head of the tool will now be described, and is shown in detail in Figs. 13 to 17 inclusive. The carrier proper is shown in Fig. 17 and is designated as a whole at 90. The carrier may be formed of any suitable light metal and comprises preferably a substantially forked shaped member having a base portion 91, and a substantially U-shaped surrounding wall or upstanding portion 92 providing a flange 93, the forward ends of which are curved inwardly and opposed, as shown at 94. The member is notched or recessed as shown at 95 and is of substantially the shape of the cap screw heads and lock washers, which it receives from the feed tube. The base 91 is slotted to provide a substantially U-shaped slot 96 through which the shanks of the cap screws project (see Figs. 13 to 16 inclusive). The purpose of extending the flange 93 to the forward or open portion of the carrier is to prevent accidental displacement of the parts as the carrier is being moved from its position beneath the feed tube to the tool head. The carrier 90 is supported by means of a pair of links 97 and 98 which are pivotally connected at their lower ends at the points 99 and 100, with the carrier, and are pivotally connected adjacent their upper ends at 101 and 102 to a bracket K' formed on sleeve $K^2$ carried by the feed tube. This sleeve is slidable on the feed tube for a purpose to be described hereinafter. The link 98 is extended upwardly and outwardly beyond the pivot 102 to provide a curved arm or lever 98a. The feed tube K is provided also with a fixed sleeve member $K^3$ having a projection or bracket $K^4$. The lower end of the feed tube is provided with means for maintaining the column of cap screws and associated lock washers in the feed tube when the carrier is removed from the bottom thereof, such means being in the form of a member pivoted at 103 to the sleeve $K^2$. This member comprises a pair of oppositely extending finger portions 104 and 105 which project through a slot formed in the sleeve and feed tube, the finger 105, normally engaging a lock washer and cap screw head as shown in Figs. 14 and 15, and the finger 104, forming a stop engaging the sleeve to prevent undue downward movement of the other finger, which might permit the parts to fall out of the tube. The finger 104 also serves to release the lower pair of parts when the carrier is moved back into engagement with the lower end of the feed tube. It will be noted that a tension spring 106 is fastened at one end to the feed tube or sleeve $K^2$ and at its opposite end to the carrier 90, this spring tending to normally maintain the carrier in contact with the lower end of the feed tube.

When it is desired to transfer a pair of parts from the feed tube to the working head A' of the tool, it is merely necessary to move the link 98 about its pivot 102. This is accomplished by the tool operator and through the medium of suitable connections extending to a point located on the tool housing which can be reached handily by the operator. These connections are, as shown, in the form of a pair of relatively slidable rods 107 and 108, each of which is connected at one end with the lever or extension 98a and the bracket $K^4$, respectively. The other ends of the rods are curved back upon themselves as shown at 107a and 108a, and an expansion spring 109 surrounds the adjacent ends of the rods and contacts the curved portions of them, the tendency of the spring being to expand and slide the members 107 and 108 relatively to one another to move the curved end portions apart, this action serving to maintain the carrier in contact with the working head of the tool after it has been moved into this position by the operator.

The means for operating the carrier to transfer parts from the feed tube to the tool head may be of any desirable construction. As shown, the slidable sleeve $K^2$ is provided with a lug or projection 110 to which a link 111 is attached, this link, in turn, being pivotally connected with a shorter link 112 pivoted to a projection 113 with an operating finger or handle 114, which is pivotally connected at 115 to a lug or bracket formed on the tool casing or housing (Figs. 10 and 11). It will be seen that the finger or operating handle 114 is located adjacent the tool handle so as to be easily manipulated by the operator. When the handle is in the position shown in full lines, the sleeve K² is in its uppermost position with the parts carrier L in contact with it and the lower end of the tube. When, however, the handle 114 is moved to the position in which it is shown in broken lines, Fig. 11, the sleeve is forced down relatively to the feed tube, moving with it the carrier L, which is now swung from its position in contact with the sleeve into position below the working head A' to transfer a cap screw and associated lock washer to the head, the spring 109, rods 107 and 108 and the links 97 and 98 functioning to impart this swinging movement to the carrier, against the action of the tension spring 106. When the handle 114 is returned to its vertical, or full line, position, the carrier L is retracted from its position below and in engagement with the tool head and swung back into position below the sleeve K² and the end of the feed tube K, in readiness to receive another cap screw and lock washer. Thus, it will be seen that the electric motor for operating the working head of the tool, and the carrier for transferring the parts are both under the control of the tool operator, and since the feed of parts to the feed tube is automatic, the operator can devote his entire time to the application of the parts to the work, the only manual operations required being those of actuating the trigger A⁴ to start and stop the motor and swinging the operating handle or finger 114 about its pivot to transfer the parts.

I claim:

1. A device for feeding parts to a portable power operated tool having a working head, in combination, a supply hopper for parts to be delivered to the tool, a chute for receiving the parts from said hopper, a conduit connecting the chute and tool for feeding parts to the tool, means interposed between the chute and conduit for selecting and transferring the parts from the chute to said conduit, means located within the conduit for starting and stopping the selector to regulate the supply of parts delivered to said tool, and means shiftable into and out of register with the lower end of said conduit for receiving and transferring the parts from the conduit to the working tool head.

2. A feeder for a portable power operated tool having a rotatable head, in combination, a supply hopper for parts to be delivered to the tool, chutes for receiving the parts from said hopper, a conduit connecting said chutes and said tool for conveying parts delivered by the hopper to the tool, a selector wheel interposed between the chutes and conduit for transferring the parts from the chutes to said conduit, an electric motor for operating said selector wheel, an electric switch in circuit with said motor located within the conduit and adapted to be engaged by the parts to control the operation of said wheel to regulate the supply of parts delivered to the tool, and means under the control of the operator shiftable into and out of register with the lower end of said conduit for transferring the parts from the conduit to the rotatable tool head.

3. A feeder for a portable power operated tool having a working head, comprising a supply hopper for parts to be fed to the tool, a pair of chutes connected with said hopper to receive the parts therefrom, a magazine for receiving parts from the chutes, a movable common selector for said chutes located between the chutes and said magazine for feeding a predetermined number of parts into the magazine, and means cooperating with the magazine for receiving and transferring the parts successively from the magazine to the working head of the tool.

4. A feeder for a portable power operated tool having a working head, comprising a supply hopper for parts to be fed to the tool, a pair of chutes connected with said hopper to receive the parts therefrom, a magazine for receiving parts from the chutes, a movable common selector for said chutes located between the chutes and said magazine for feeding said parts in a column into the magazine, means adapted to be operated by a part in said magazine for arresting the movement of the common selector when a predetermined number of parts have been fed into the magazine, and means cooperating with the magazine and under the control of the operator for receiving and transferring the parts successively from said magazine to the working head of the tool.

5. A feeder for a portable power operated tool having a working head, in combination, a supply hopper for parts to be fed to the tool, a pair of chutes connected with said hopper to receive the parts therefrom, a magazine for receiving parts from the chutes, a rotatable common selector for said chutes located between the chutes and said magazine for feeding said parts in a column into the magazine, and means adapted to be operated by a part in said magazine for arresting the movement of the common selector when a predetermined number of parts have been fed into the magazine.

6. A feeder for a portable power-operated tool, in combination, a supply hopper for parts to be fed to the tool, a pair of chutes connected with said hopper to receive the parts therefrom, a common selector for said chutes for removing the parts from the chutes, a conduit for receiving the parts from the selector and delivering them to the tool, and a switch located within the conduit for controlling the operation of the selector.

7. A feeder for a portable power-operated tool, in combination, supply hoppers for parts to be fed to the tool, conveyors in said hoppers, a pair of chutes for receiving the parts from the conveyors, a selector for removing parts from the chutes, a conduit for receiving the parts from the selector and delivering them to the tool, and a switch located within the conduit for controlling the operation of the selector.

8. A feeder for a portable power operated tool having a working head, comprising a supply hopper for parts to be delivered to the tool, a chute for receiving the parts from said hopper, a conduit associated with the chute for delivering the parts at a point adjacent the working head of the tool, a selector for transferring the parts from the chute to the conduit, means located within the conduit for controlling the operation of the selector, and means cooperating with the lower end of the conduit for receiving and transferring the parts from the conduit to the working head.

9. A feeder for a portable power operated tool having a working head, comprising a supply hopper for parts to be fed to the tool, a chute for receiving parts from said hopper, a selector for removing parts from the chute, a conduit for receiving the parts from the selector and for delivering them to the tool, a switch located in the conduit, means actuated by the switch to start and stop the selector, and a transfer device cooperating with the lower end of the conduit for receiving and transferring parts from the conduit to the working head.

10. In a power operated tool mechanism, in combination, a supply container for different work parts such as screws and washers, a tool head for applying the work parts, a magazine for receiving and conducting the work parts to said tool head, means for successively feeding the parts from the container to the magazine, a selector located between said feeding means and said magazine for successively assembling different parts together, and means operated by the work parts in the magazine for stopping said selector at predetermined times.

EARL SEGER.